(12) United States Patent
Gondek

(10) Patent No.: US 6,559,982 B1
(45) Date of Patent: May 6, 2003

(54) ACCURATE MONITOR TO PRINTER COLOR REPRODUCTION TECHNIQUE

(75) Inventor: Jay S Gondek, Camas, WA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/228,881

(22) Filed: Jan. 12, 1999

(51) Int. Cl.$^7$ ................ G03F 3/08; H04N 1/46
(52) U.S. Cl. ............... 358/518; 358/520; 358/516
(58) Field of Search ............... 358/518, 520, 358/516

(56) References Cited

U.S. PATENT DOCUMENTS

| | | | | |
|---|---|---|---|---|
| 5,609,978 A | * | 3/1997 | Giorgianni et al. | 358/505 |
| 5,717,783 A | * | 2/1998 | Endo et al. | 358/518 |
| 5,754,682 A | * | 5/1998 | Katoh | 358/518 |
| 5,929,906 A | * | 7/1999 | Arai et al. | 348/157 |
| 6,373,596 B1 | * | 4/2002 | Hikada | 358/1.9 |

FOREIGN PATENT DOCUMENTS

| JP | 07220083 | * | 8/1995 | G06T/7/00 |
|---|---|---|---|---|

* cited by examiner

Primary Examiner—Edward Coles
Assistant Examiner—Ashanti Ghee

(57) ABSTRACT

When a monitor display is to be printed by a color printer, the present invention transforms the monitor colors to compensate for chromatic adaption while mapping the monitor's neutral axis with the printer's neutral axis so neutral colors remain neutral. In the preferred embodiment, it is assumed that there is only partial chromatic adaption by the viewer. The result is that printing the transformed monitor colors using a color printer causes printed colors to appear to the human eye to be similar to the displayed monitor colors, while preserving neutral colors, once the human eye has adapted to the displayed monitor colors and the printed colors.

14 Claims, 7 Drawing Sheets

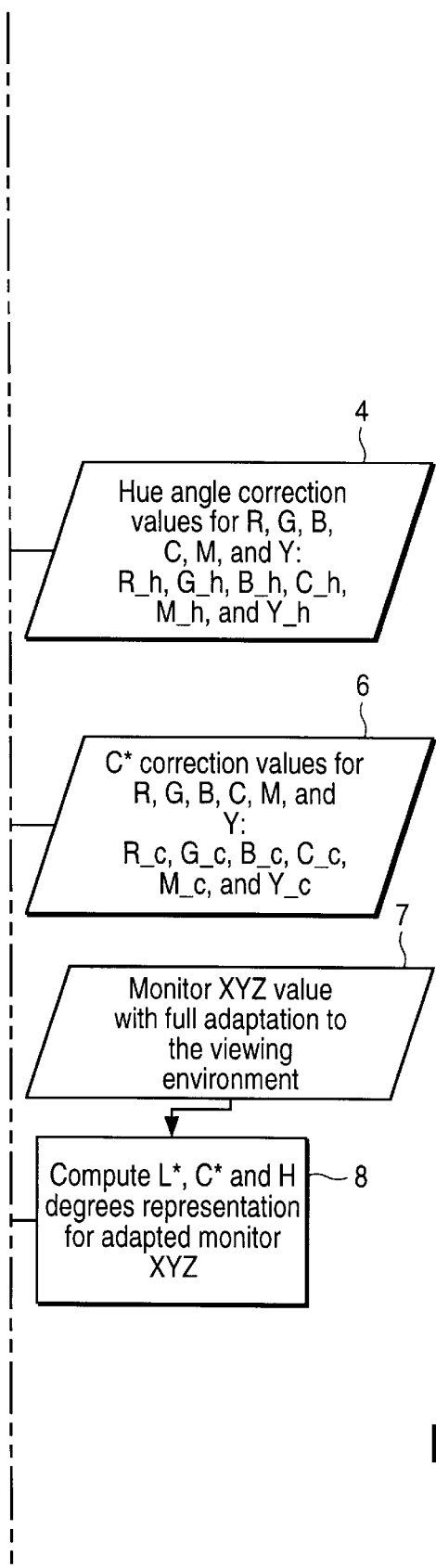

ACCURATE MONITOR TO PRINTER COLOR REPRODUCTION TECHNIQUE

FIELD OF THE INVENTION

This invention relates to printers and, in particular, to a method for accurately reproducing a color image by a color printer.

BACKGROUND

When reproducing a computer monitor's displayed color image by a color printer, the user typically wants the exact same colors the user perceives on the monitor to be printed on white paper. The human eye adapts a viewed color to a "white" reference on the medium displaying the color. This is referred to as chromatic adaptation. However, the human eye does not completely adapt to the white point of the monitor.

The monitor white "color" is generally not the same white as the paper viewed under standard office light. For example, the white point on a monitor screen may have certain red, green, or blue components, while the white point of paper is generally that of the viewing illuminant having color components different from that of the monitor white point. Therefore, since the white references on the monitor and the paper are different, simply converting the RGB primary color components used to form the monitor colors to the corresponding cyan, magenta, and yellow (CMY) primary color ink components used in a color printer will not accurately reproduce (to the human eye) the colors perceived by the user when viewing the monitor.

An additional factor affects the viewer's perception of color. Printed color on white paper is usually viewed in a well lit environment, causing the white paper to be bright. The monitor screen is typically viewed in a darker area, giving the perception that the monitor white point is fairly bright. If the monitor white and paper white were viewed under the same illumination, the monitor white would appear less bright. This would further distance the monitor white from the paper white.

Accordingly, monitor white may not only contain color components that are different from the components in the paper white but may also be darker than the paper white.

As seen, due to chromatic adaptation, simply converting the RGB monitor signals into the corresponding CMY printer signals do not reproduce the colors on the monitor as viewed by the human eye.

To compensate for the chromatic adaptation, prior solutions have included shifting the monitor RGB color signals. One approach is to assume full chromatic adaptation and then determine the shift in colors to cause the monitor white point to be the same as the paper white point (assuming a particular viewing illuminant.) One problem with this approach is that full chromatic adaptation of the human eye does not occur.

Another problem discovered by the Applicants with prior art solutions is that shifting the monitor colors also shifts neutral colors (i.e., gray scale colors.) A user generating gray scale colors on a monitor does not wish these gray scale colors to contain any CMY colors when printed. Rather, the user would want the gray scale to be printed using a black dot halftone image.

Hence, what is needed is an improved technique for accurately reproducing monitor colors by a color printer without shifting the neutral axis.

SUMMARY

In one embodiment, the process includes transforming non-neutral monitor colors to generate transformed monitor colors, such that printing the transformed monitor colors using a color printer causes printed colors to appear to the human eye to be similar to the monitor colors displayed on a monitor, while preserving neutral colors, once the human eye has adapted to the monitor colors and the printed colors.

When a monitor display is to be printed by a color printer, the present invention changes the monitor colors to compensate for chromatic adaptation while mapping the monitor neutral axis precisely with the printer's neutral axis so neutral colors remain neutral.

In the preferred embodiment, it is assumed that there is only partial chromatic adaptation by the viewer.

DETAILED DESCRIPTION OF THE EMBODIMENTS

The present invention transforms a computer monitor's color signals to color signals for use by a color printer, such that when the monitor screen image is printed on a sheet of white paper and viewed in an anticipated viewing environment, the printed colors appear to match the colors displayed on the monitor. In a preferred technique, the neutral axis (gray scale) of the monitor is not shifted during the transformation so that no color is introduced into any gray scale image displayed on the monitor.

Figure 1:
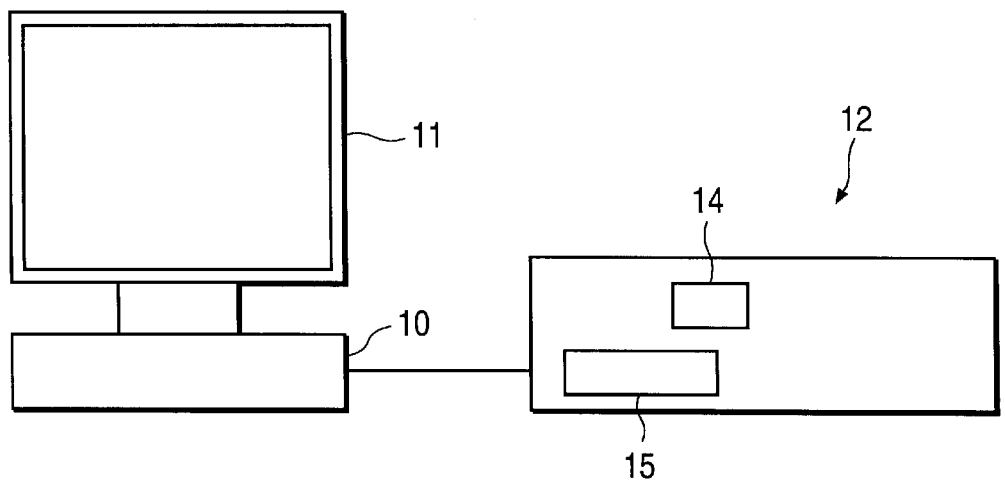
FIG. 1 illustrates a computer connected to a color inkjet printer, where the computer or the printer or both carry out the inventive technique.

FIG. 1 is a schematic diagram of a typical printing system, which includes a host computer 10, a color monitor 11, and a color printer 12. Monitor 11 may be a CRT type, an LCD type, or any other type of color display. Printer 12 may be any type of color printer, such as an inkjet printer which employs multiple printheads, each printing a primary color ink. Such primary colors typically include cyan, yellow, and magenta. These printheads are typically mounted on a scanning carriage which scans back and forth across a sheet of white paper while the paper is incrementally transported through a print zone. Printer 12 may also contain a black printhead. A black color may also be obtained by a mixture of the C, M, and Y inks. Block 14 in FIG. 1 represents the scanning printheads. Printer 12 includes a printer controller 15 for controlling the printing of dots by the printheads 14.

More detail regarding the operation of one type of color inkjet printer 12 is described in U.S. patent application Ser. No. 08/880,475, filed Jun. 23, 1997, entitled "Correlating Cyan and Magenta Planes For Error-Diffusion Halftoning," by Jay Gondek, assigned to the present assignee and incorporated herein by reference.

Figure 2:
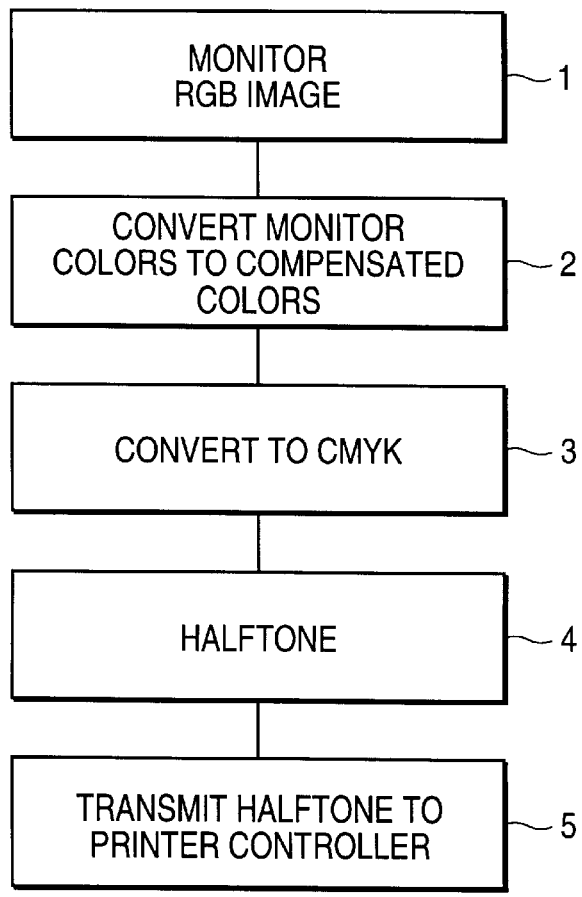
FIG. 2 illustrates the general method performed by the computer and printer of FIG. 1.

FIG. 2 illustrates the standard flow of image information from computer 10 to printer 12. A monitor image is first created and introduced into the memory of computer 10. This image is usually represented in additive RGB color space. Each pixel location on the screen is illuminated using red, green, and blue components each having, for example, one of 256 (0–255) levels of intensity. Each of the three primary colors typically requires 8 bits; therefore, RGB color monitors are commonly referred to as producing 24-bit color (3×8=24). This image is represented at the spatial resolution of the particular monitor.

In step 1 of FIG. 2, the monitor RGB signals are held in the memory of computer 10 so that the corresponding colors can be displayed on monitor 11.

In step 2 of FIG. 2, the RGB monitor signals are compensated in accordance with the invention so that the color image viewed on the monitor in the monitor viewing environment will be accurately reproduced on a sheet of white paper, using a color printer, even though the white point of the monitor and the white point of the paper are different and even though the monitor and paper are viewed in different environments.

This conversion in step 2 may be performed at either the resolution of the monitor or the resolution of the printer.

In step 3, the compensated RGB color image is converted into CMYK color space using a look-up table or other conventional means of conversion.

In step 4, the CMYK image is halftoned to enable the 256 possible intensities per primary color to be reproduced using dots of CMYK inks. In other words, the color at each pixel location is converted into a pattern of on or off C, M, Y, or K dots to effectively reproduce the desired color at a distance where the human eye does not perceive the individual dots.

In step 5, the halftone image is transmitted to the printer (if the above process is performed in computer 10), typically using efficient communication techniques such as using escape sequences like those identified in Hewlett-Packard Company's printer control language (PCL).

Since the present invention is primary concerned with details of the process performed in step 2 of FIG. 2, and the other steps may be conventional, only step 2 will be described in detail. Additional information regarding the remaining steps may be found in U.S. patent application Ser. No. 08/880,475, filed Jun. 23, 1997, entitled "Correlating Cyan and Magenta Planes For Error-Diffusion Halftoning," by Jay Gondek, previously mentioned.

Figure 3:
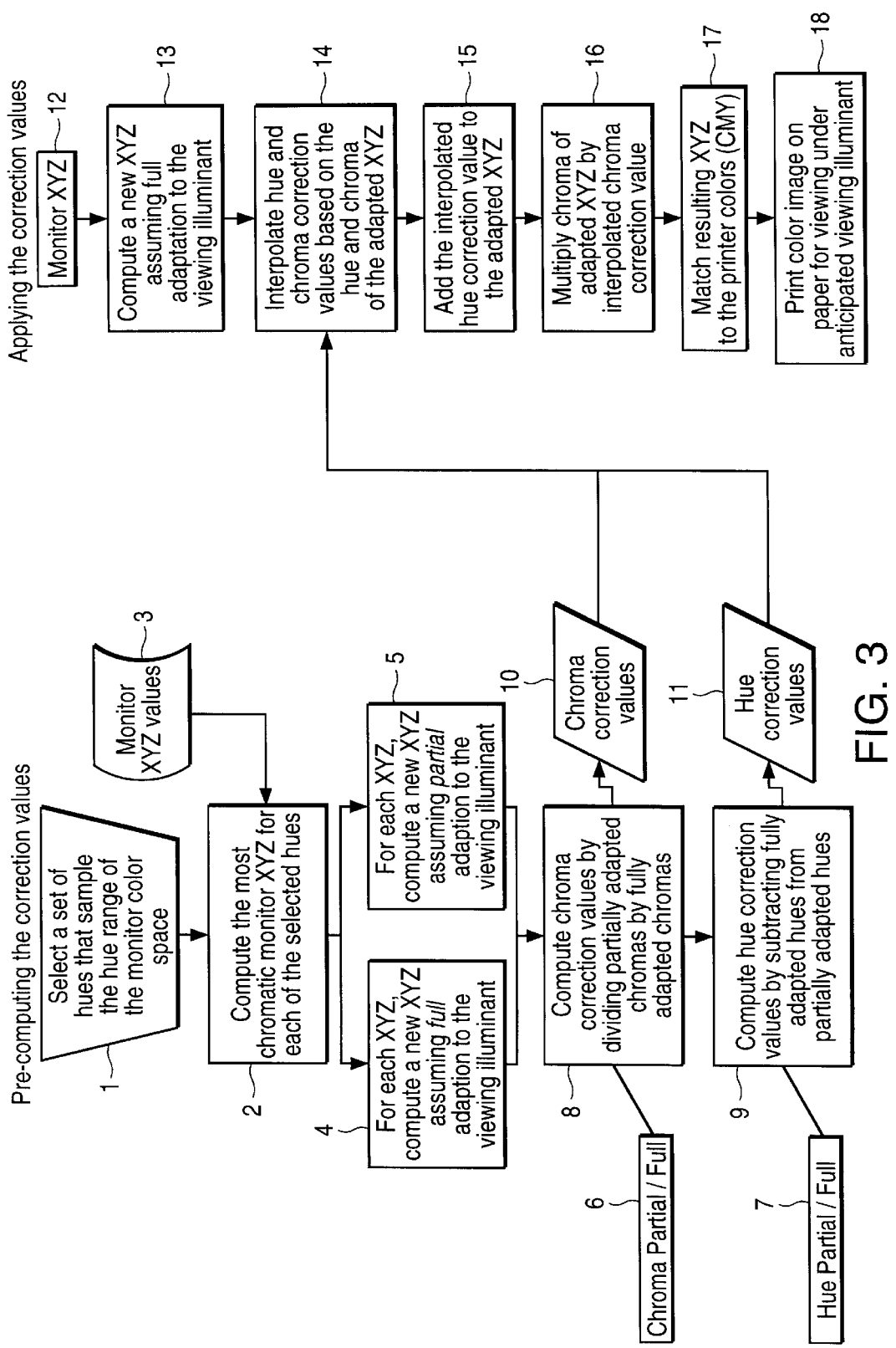
FIG. 3 is a flow chart showing the basic steps used in one embodiment of the present invention for converting monitor color signals to converted signals for printing by the color printer so that the printed colors match those colors perceived by the viewer of the monitor screen.

FIG. 3 is a flow chart representing the basic steps for more accurately reproducing a monitor color image on a sheet of paper. Details of various blocks in FIG. 3 will be provided in the subsequent figures.

The flow chart of FIG. 3 is divided into two groups of steps: one group for precomputing correction values; and the other group for applying the correction values to the monitor colors. The corrected monitor colors are those reproduced by a color printer.

The embodiment shown in FIG. 3 precomputes correction values for only a subset of the colors that the monitor may generate in order to conserve memory space. The correction values are later interpolated for the actual color generated by the monitor. In another embodiment, a set of correction values may be generated for any or all of the monitor colors (typically about 16 million).

In step 1 of FIG. 3, a set of hues is selected that samples the hue range of the monitor color space. In one embodiment, the samples are the monitor primary and secondary hues R, G, B, C, M, and Y. The term hue refers to the dominant wavelength in a mixture of light waves. Put another way, the hue represents the dominant color as perceived by an observer. Thus, the full spectrum of visible colors is composed of various hues.

In step 2, the best match between a possible monitor color and each hue in the sample set is computed. Step 3 represents the set of possible monitor colors.

Monitor colors can be specified using a variety of color models. One color model is to specify the amounts of red, green, and blue in a color, where each of the primary colors has a normalized range of intensity between 0 and 1, and where "equal energy white" is created using equal amounts of R, G, and B. The RGB levels are referred to as tristimulus values. Another color model (or color space) uses the primary terms X, Y, and Z. Well known equations are used to convert one color space into another color space. The transformation equations to convert between the RGB color space and the XYZ color space are fully explained in the book entitled "Digital Pictures," by A. Netravali and B. Haskell, Plenum Press, New York, pages 48–53, the entire book being incorporated herein by reference to illustrate what is known to those skilled in the art.

We will use the XYZ color space in FIG. 3, although using other color spaces may suffice.

The steps for precomputing correction values may be performed using a programmed computer. Precomputing the correction values may be performed by the printer manufacturer, and the correction values stored on a printer driver diskette. The printer driver is associated with a particular printer, and the printer driver software is loaded into a conventional personal computer. The printer driver software may contain the program to be carried out by the computer to perform all or a part of the processes described herein. Accordingly, no additional hardware is needed for implementing the present invention other than a conventional color printer and a conventional personal computer programmed with the required software.

In step 4 of FIG. 3, for each monitor XYZ color value identified in step 2, a new XYZ value is computed assuming full chromatic adaptation to the anticipated paper viewing illuminant. This means that the white point of the monitor, to which all monitor colors are referenced, is now transformed to the white point of the paper to be printed upon as viewed under the anticipated viewing illuminant. As an example, the graphics display program running on a computer may cause the monitor white point to be correlated to that of daylight. The amount of R, G, and B necessary to display this monitor white is then calculated, and these RGB values are normalized so that, when it is intended to display white on the monitor, R=G=B=1 (i.e., R, G, B all maximum value of 255). A printed image on white paper is typically not viewed in daylight but viewed in an office environment using artificial light, so the paper white will be that of the artificial light.

Since colors are perceived by the human eye with reference to the white point of the monitor or the paper, step 4 transforms the monitor XYZ colors with reference to the monitor white point to a set of new XYZ colors referenced to the paper viewing illuminant (assumed to be the white point of the paper). Details of this step are provided in subsequent figures. The monitor white point and paper viewing illuminant values may be obtained by measurement, by computation, or by applying accepted standards.

In step 5, each monitor XYZ color from step 2 will be transformed to a new XYZ color assuming a partial adaptation to the viewing illuminant.

Step 5 is conducted in a way similar to that of step 4 except that we do not fully adjust the monitor's XYZ color based on the paper white point reference but only partially adjust the XYZ color, such as to a white point reference half-way between the monitor white point and the paper white point.

In steps 6 and 7, the values in XYZ color space obtained in steps 4 and 5 are converted into the chroma/hue color space, where hue represents the dominant color as perceived by an observer, such as one of the colors of the spectrum, and chroma is the saturation of the hue. Saturation refers to the relative purity or the amount of white light mixed with a hue. The purest spectrum colors are fully saturated. Colors such as pink (red and white) and lavender (violet and white) are less saturated, with the degree of saturation being inversely proportional to the amount of white light added. Hue is expressed in degrees relative to red (0 degrees). This color space is referred to as either the LCH color space, where L is luminance, or the HSI color space, where I is intensity. Conversion from the RGB color space to the HSI color space is described in the book "Digital Image Processing," by R. Gonzalez and R. Woods, pages 229–237, published by Addison-Wesley Publishing Company, 1993, incorporated herein in full by reference. Conversion between RGB, XYZ, and HSI (or LCH) is well known to those skilled in the art and need not be described herein.

In step 8, chroma correction values are computed by dividing the partially adapted chroma values (from step 5) by the fully adapted chroma values (from step 4).

In step 9, hue correction values are computed by subtracting the fully adapted hue values from the partially adapted hue values.

The chroma correction values derived from step 8 are stored in step 10, and the hue correction values derived in step 9 are stored in step 11.

At this point, hue and chroma correction values for a subset of all the possible monitor colors have been generated. The following is a description of how these correction values are applied to the monitor colors to identify printer ink colors for printing on white paper that will be perceived by the human eye to match the colors perceived on the monitor.

In step 12, colors for display on the monitor are generated using, for example, a graphics program operated by the user. It will be assumed that these colors have been transformed into the XYZ color space, although the present technique can be performed in any color space.

In step 13, the monitor colors generated are each transformed into new XYZ colors assuming full adaptation to the viewing illuminant. This step is similar to that performed in step 4 for the subset of colors.

XYZ values obtained in step 13 that correspond to R=G=B, meaning that the color is neutral, will have a zero chroma value. This causes the neutral colors to not be corrected, as will be seen when discussing step 16. Alternatively, the white component of a color may be subtracted prior to correction, thus causing neutral colors to not be corrected. In another embodiment, a neutral color is identified and is caused to bypass the correction process.

In step 14, appropriate hue and chroma correction values for the monitor hue and chroma are interpolated from the sample values stored in steps 10 and 11. Since the monitor hue and chroma will most likely not match one of the hues in the sample set of hues, the chroma and hue correction values will have to be interpolated to correspond to the actual monitor hue and chroma. Any suitable interpolation technique may be used to calculate chroma and hue correction values for a particular monitor color generated. If chroma and hue correction values were precalculated for all possible monitor colors, step 15 would be deleted.

In step 15, the interpolated hue correction value is added to the hue of the adapted XYZ value. This may be performed by converting the adapted XYZ value into hue and chroma values and then adding the hue correction value to the adapted hue value.

In step 16, the chroma of the adapted XYZ value is multiplied by the interpolated chroma correction value. For neutral colors, the chroma value is zero, so multiplying this chroma value by any chroma correction value will still result in a zero chroma value. This results in neutral colors not being shifted. Additionally, using the preferred embodiment, the white component is subtracted from the colors used to precompute correction values, thus causing monitor neutral colors to have no associated correction values.

The result of steps 15 and 16 is a corrected color in any one of a variety of color spaces. In the embodiment shown in FIG. 3, the resulting color of steps 15 and 16 is transformed into the XYZ color space.

In step 17, the corrected or neutral color is matched to the set of possible printer colors using a look-up table or using other well known techniques. The printer colors will typically be defined using a combination cyan, magenta, yellow and black inks.

In step 18, this matched color will then be printed by the color printer on white paper, which will have a white point being approximately that of the viewing illuminant assumed in the previously described steps.

When the color image on the white paper is viewed in the anticipated viewing illuminant, the human eye will perceive the color as being the same as the monitor color.

Figure 4:
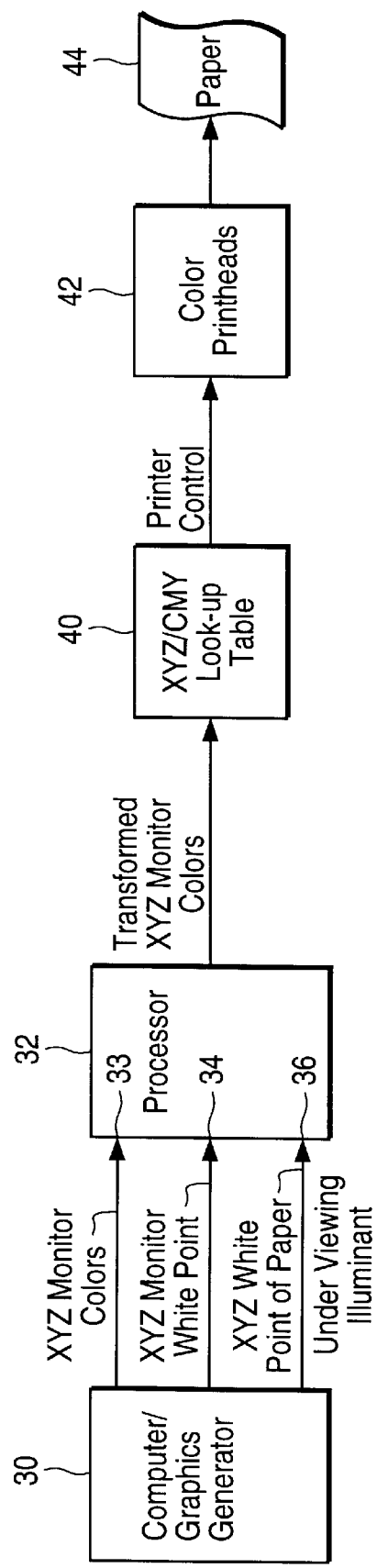
FIG. 4 illustrates one embodiment of an apparatus for converting monitor color signals into printer signals.

FIG. 4 is a diagram illustrating a hardware embodiment for carrying out the inventive process. In one embodiment of the invention, only existing hardware used in a conventional personal computer and color printer is needed, since the conversion of the monitor colors may be performed by the computer. A computer/graphics generator 30 which forms part of the computer 10 in FIG. 1 generates in FIG. 4 the monitor colors pursuant to an applications program, typically under the control of the user. The computer/graphics generator 30 is controlled to output the XYZ monitor colors 33 to a processor 32. These monitor colors may also be displayed.

The white points of the monitor and paper are also input into processor 32. The white point of the monitor can be generated by, for example, simply requesting the graphics program to output a white color signal and detecting the resulting XYZ monitor signal. The white point can also be a previously stored value taken from measurements or based on the known white point of the monitor. This XYZ monitor white point value is applied to input 34 of processor 32.

The XYZ white point of the paper on which the color image is to be reproduced under the anticipated viewing illuminant may also be obtained from measurement or it may be a previously determined value. This paper white point value is applied to input 36 of processor 32.

Processor 32 performs the processes described in the various flow charts in this disclosure and outputs transformed XYZ monitor colors to a look-up table 40 that matches the transformed XYZ monitor color to a printable color in the CMY color space, or any other color space used by a color printer.

The resulting CMY signals are then applied to color printheads 42 in a color printer, and the CMY inks are then applied to a sheet of paper 44 to be viewed under the anticipated viewing illuminant. The resulting color on paper 44 when viewed by the human eye will then closely match the color perceived by the human eye when displayed on the monitor.

Figure 5:
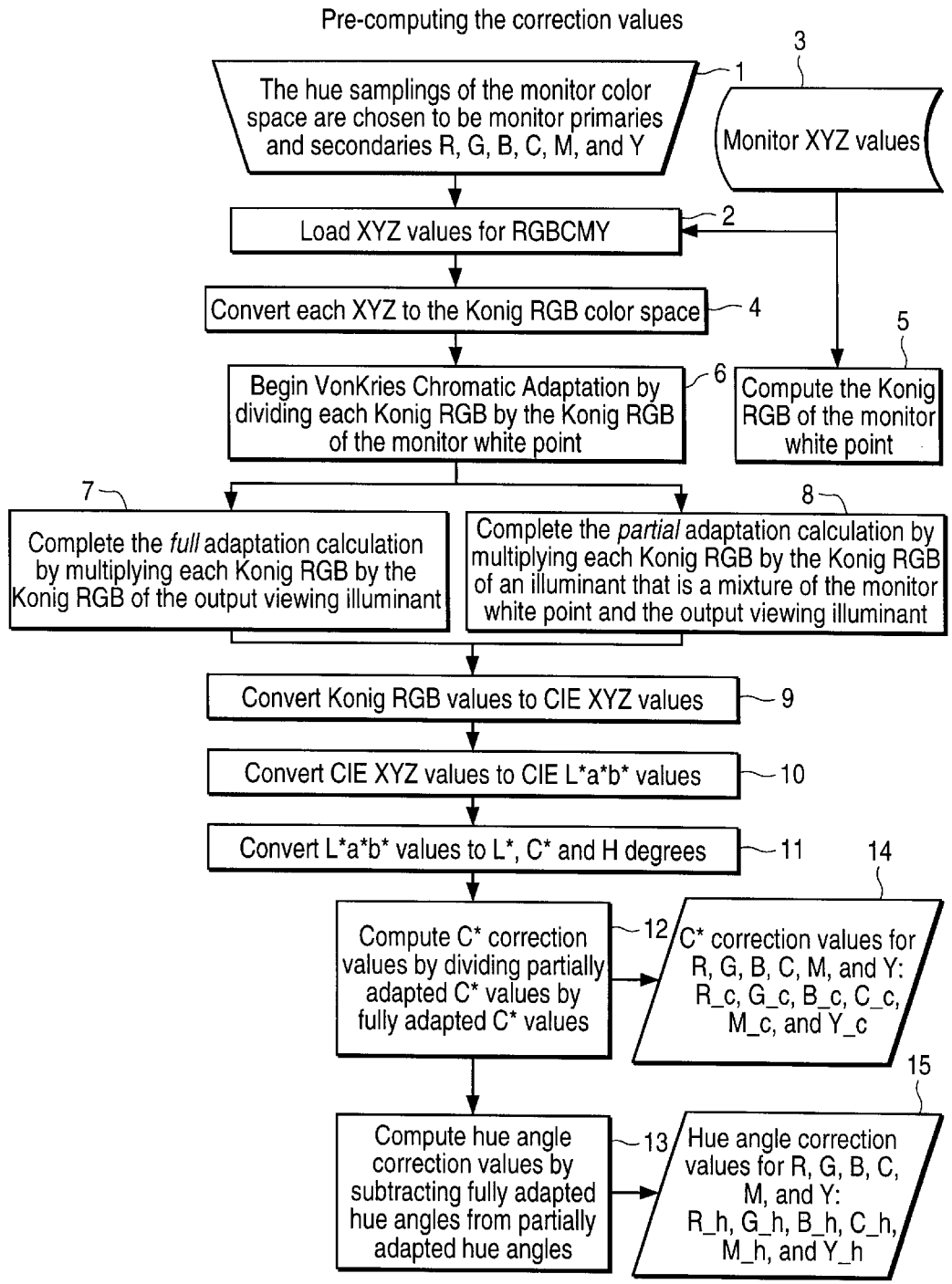
FIG. 5 is a detailed flow chart showing the steps used in one embodiment for precomputing hue and chroma correction values.

FIG. 5 illustrates in greater detail one embodiment of the precomputing of the correction values described in FIG. 3.

In step 1 of FIG. 5, the hue samplings of the monitor color space are chosen to be monitor primaries and secondaries R, G, B, C, M, and Y. Thus, six hue samplings are chosen.

In step 2 of FIG. 5, the RGBCMY values are matched to their closest monitor XYZ values. The monitor XYZ values are shown generated in step 3.

As previously stated, the color space used to identify colors is not particularly relevant because the same color may be represented in various color spaces. Certain transformations are more easily performed in a particular color space, and this is why during the various processes described herein one color space is converted into another color space.

In step 4 of FIG. 5, the XYZ colors identified in step 2 are converted to the Konig RGB color space. This is a well-known process and need not be described herein in detail. The Konig color space is described in the book entitled, "Color Science: Concepts and Methods, Quantitative Data and Formulae," by Wyszecki and Stiles, published by John Wiley and Sons, incorporated here in its entirety by reference.

In step 5, the monitor XYZ white point is identified and converted to the Konig RGB color space.

In step 6, each Konig RGB identified in step 4 is divided by the Konig RGB monitor white point identified in step 5. This mathematical process initiates what is referred to as the Von Kries chromatic adaptation technique. More detail of the Von Kries chromatic adaption is found in the book by Wyszecki et al. identified above.

In step 7, the full chromatic adaption calculation is completed by multiplying each Konig RGB value obtained in step 6 by the Konig RGB of the paper viewing illuminant (which is the same as the paper white point in the anticipated viewing illuminant).

In step 8, a partial adaptation calculation is completed by multiplying the results of step 6 by the Konig RGB of an illuminant that is a mixture of the monitor white point and the anticipated paper viewing illuminant (i.e., the paper white point.) In one embodiment, this illuminant is approximately half-way in between the monitor white point and the paper white point.

In step 9, the resulting Konig RGB values obtained in steps 7 and 8 are converted to standard XYZ values, as specified by the CIE (Commission International de l'Eclairage—The International Commission on Illumination).

In step 10, the XYZ values are converted to another color space: L*a*b* (LAB), well-known to those skilled in the art. CIE LAB is sometimes referred to as the color difference formula. This color space is described in the book by Wyszecki et al. identified above. The conversion from one color space to another is performed using simple well-known equations. Conversion from one color space to another is done for convenience and is not necessary for the invention. The various conversions from one color space to another may be done in various ways using, for example, a computer or a look-up table.

In step 11, the CIE LAB values are converted to L*, C*, and H degrees. This CIE LCH color space is generally referred to as the lightness, chroma, and hue color space.

In step 12, the chroma correction value for each monitor color specified in step 2 is computed by dividing the partially adapted chroma values (stemming from step 8) by the corresponding fully adapted chroma values (stemming from step 7).

In step 13, the hue angle correction values are obtained by subtracting the fully adapted hue angles (stemming from step 7) from the partially hue angles (stemming from step 8.)

Step 14 simply shows the output of the computed chroma correction values for each of the monitor colors identified in step 2: R, G, B, C, M and Y. These chroma correction values are now designated R_c, G_c, etc.

Step 15 shows the output of the hue angle correction values for each of the monitor colors identified in step 2. These hue correction values are designated R_h, G_h, etc.

At this point, the correction values for a sample set of monitor XYZ values has been generated.

Figure 6A:
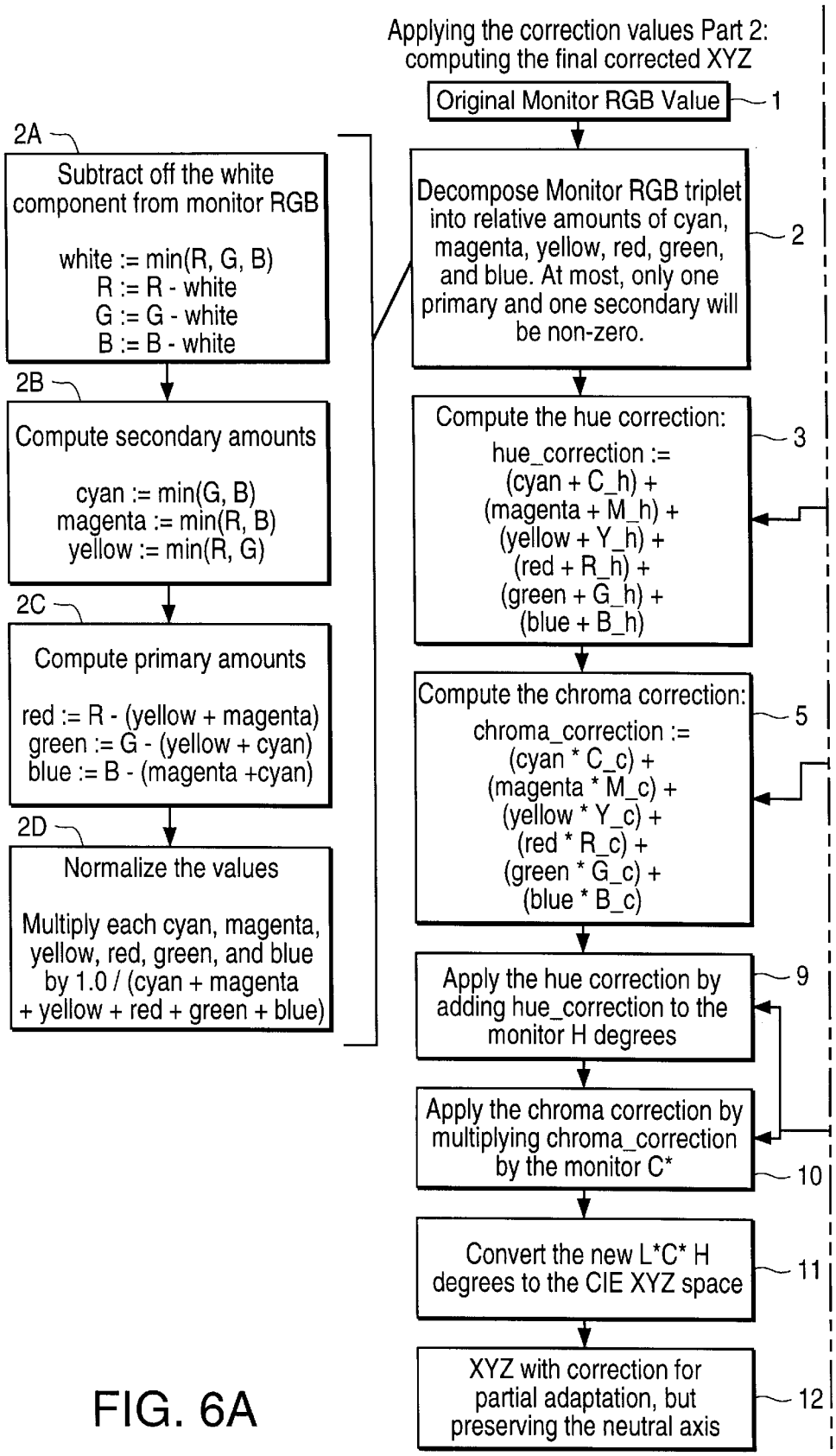
FIG. 6 is a detailed flow chart showing the steps used in one embodiment for applying the hue and chroma correction values to the monitor color signals for computing the final color signals for printing.

FIG. 6 is a flow chart illustrating the application of the precomputed correction values to a monitor RGB value being generated, typically by a program being run by the user.

In step 1 of FIG. 6, the original monitor RGB values are generated and likely displayed on the monitor to the user. These values will ultimately be converted to printer signals for printing a reproduction of the displayed image on a sheet of paper, presumably of a white color viewed under the anticipated viewing illuminant.

In step 2 of FIG. 6, the monitor RGB color triplet is decomposed into relative amounts of cyan, magenta, yellow, red, green, and blue. At most, only one primary (red, green, blue) and one secondary (cyan, magenta, yellow) will be non-zero. By only determining the relative amounts and not the absolute amounts, the neutral axis can be ignored, where R=G=B. Steps 2A, 2B, 2C and 2D illustrate the steps used to perform step 2.

In step 2A, the white component from the monitor RGB signal is subtracted off to obtain new RGB values. This white component is the extent that all three R, G, and B components appear in the color. Subtracting the white component will cause at least one of the R, G, and B components to be zero. This allows the color to be conveyed by, at most, a single primary and a single secondary color. Neutral monitor colors will have no correction values.

In step 2B, the amounts of the secondary colors, cyan, magenta, and yellow, are computed based on the RGB values obtained in step 2A.

In step 2C, the primary color amounts are computed using the results of steps 2A and 2B.

Finally, in step 2D, the values are normalized as shown in the flow chart.

In step 3, the hue corrections for each of the primary and secondary colors are computed using on the hue angle correction values obtained from the method of FIG. 5. The precomputed hue correction values are shown being provided by step 4 in FIG. 6.

In step 5, the chroma correction values for each of the primary and secondary colors are computed. These values are obtained from the method of FIG. 5, and the precomputed chroma correction values are shown in step 6.

Accordingly, after step 5, hue and chroma correction values are associated with an original monitor color generated in step 1 of FIG. 6, and monitor colors along the neutral axis have no correction values (due to step 2A).

Steps 2 through 6 effectively perform the interpolation of the precomputed hue angle and chroma correction values for the subset of hues (RGBCMY) so that the correction corresponds to the actual monitor color value, while preserving the neutral axis. Such interpolation may be performed in a variety of ways and need not be performed at all if a correction value were precomputed for each of the monitor colors. In the remaining steps, the interpolated hue and chroma correction values will be applied to the actual monitor colors being generated.

In step 7 of FIG. 6 (corresponding to step 13 in FIG. 3), the monitor color values are converted into the XYZ color space and transformed assuming full chromatic adaption to the anticipated viewing environment of the paper. This step 7 may be performed using the flow chart of FIG. 7, which will be addressed after the discussion of FIG. 6 has been completed.

In step 8 of FIG. 6, the monitor XYZ color values are converted into the CIE LCH color space using conventional techniques, where L corresponds to lightness, C corresponds to saturation, and H corresponds to hue. Conversions to the CIE LCH color space are described in the book by Wyszecki et al., previously identified. Such conversion is also described in the book entitled "Digital Image Processing," chapter 4, by Gonzales, et al., previously identified. These books in their entirety are incorporated herein by reference to illustrate what would be known to one of ordinary skill in the art.

In step 9 of FIG. 6, the hue correction generated in step 3 is added to the hue angle generated in step 8.

In step 10, the chroma correction value generated in step 5 is multiplied by the C component of the monitor color generated in step 8.

In step 11, the resulting corrected hue and chroma values are converted to the CIE XYZ color space. This is a conventional conversion and need not be discussed in detail.

The results of the process are shown in step 12 which is the corrected monitor XYZ color that has been corrected for partial adaption, but preserving the neutral axis. Partial adaption to the monitor white point and paper white point is more realistic than assuming full adaption. The corrected XYZ values are then used for identifying corresponding CMY or CMYK color for printing by the color printer.

Figure 7:
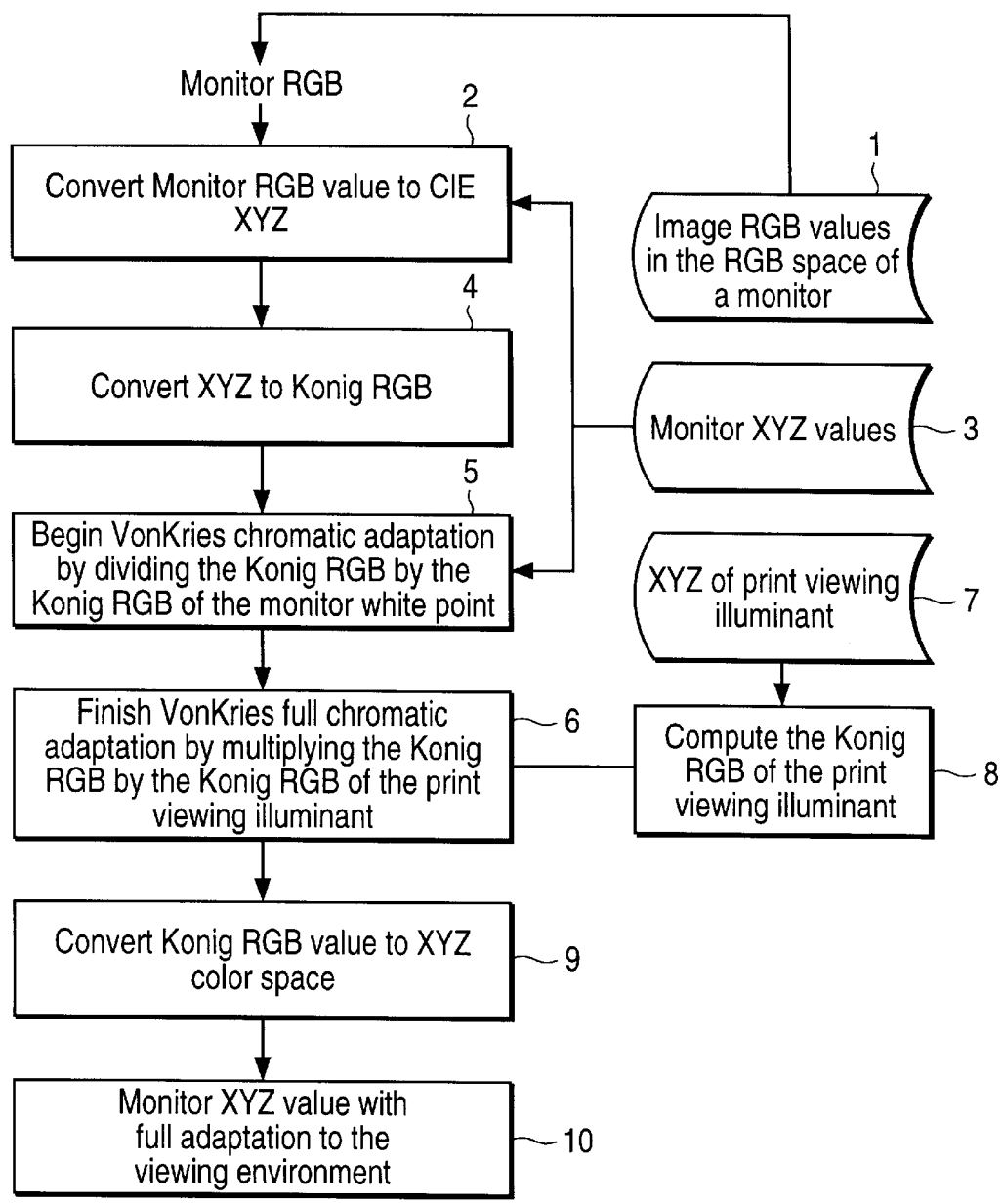
FIG. 7 is a flow chart of steps performed within step 7 of FIG. 6.

FIG. 7 illustrates in greater detail step 7 of FIG. 6 for converting the monitor XYZ value into a converted value assuming full chromatic adaptation to the paper viewing environment.

In step 1 of FIG. 7, the monitor RGB values are generated and are typically displayed on the monitor.

In step 2, the monitor RGB values are converted to the CIE XYZ color space.

The conversion may be applied by simply matching the RGB value to an XYZ value stored in step 3. Such conversion may be by using a look-up table or any other means.

In step 4, the XYZ values obtained in step 2 are converted to the Konig RGB color space.

In step 5, the Von Kries chromatic adaption technique is begun by dividing the Konig RGB from step 4 by the Konig RGB of the monitor white point.

In step 6, the calculations for the Von Kries full chromatic adaption are completed by multiplying the Konig RGB values by the Konig RGB print (or paper) viewing illuminant. Step 7 illustrates that the XYZ value of the print viewing illuminant is stored, and step 8 computes the Konig RGB of the print viewing illuminant for use during step 6.

In step 9, the Konig RGB values obtained in step 6 are converted to the XYZ color space.

In step 10, the monitor XYZ values with full adaption to the viewing environment are provided for use in the method illustrated in FIG. 6.

Thus, various methods have been described to convert an original monitor color value into compensated color values for conversion to the printer color ink space to more accurately reproduce the colors displayed on the monitor. Assuming that partial adaptation and not full adaptation occurs, the human eye will perceive the colors printed on the white sheet of paper as being the same colors viewed on the monitor screen, while preserving the neutral axis. In other words, the monitor gray scale will not be shifted towards any color.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method for transforming monitor colors to printer colors comprising:

generating monitor colors;

transforming non-neutral monitor colors to generate transformed monitor colors, such that printing said transformed monitor colors using a color printer causes printed colors to appear to a human eye to be similar to said monitor colors, while preserving neutral colors, once said human eye has adapted to said monitor colors and said printed colors, said transforming including generating hue correction values and chroma correction values for said monitor colors, and applying said hue correction values and said chroma correction values to said monitor colors to generate said transformed monitor colors; and converting initial monitor colors, said initial monitor colors for being displayed on said monitor, to fully adapted monitor colors, assuming full adaption to an anticipated viewing illuminant of a sheet of paper on which is to be printed said transformed monitor colors; wherein said applying includes applying said hue correction values and said chroma correction values to said fully adapted monitor colors to generate said transformed monitor colors, and wherein said generating hue correction values and chroma correction values comprises: calculating a set of hue correction values and chroma correction values for associated monitor colors that may be displayed on a monitor, said calculating comprising: computing a set of fully adapted monitor colors, assuming full adaption to an anticipated viewing illuminant of a sheet of paper on which is to be printed said transformed monitor colors, to obtain fully adapted hue values and chroma values representing said fully adapted monitor colors; computing a set of partially adapted monitor colors, assuming partial adaption to an anticipated viewing illuminant of a sheet of paper on which is to be printed said transformed monitor colors, to obtain partially adapted hue values and chroma values; computing chroma correction values by dividing said partially adapted chroma values by said fully adapted chroma values; and computing hue correction values by subtracting said fully adapted hue values from said partially adapted hue values.

2. The method of claim 1 wherein said applying comprises:

adding a hue correction value to a hue of an associated fully adapted monitor color to obtain a transformed hue of said monitor color;

multiplying a chroma correction value by a chroma of an associated fully adapted monitor color to obtain a transformed chroma of said monitor color; and using said transformed hue and said transformed chroma to generate a transformed monitor color.

3. The method of claim 2 further comprising:

printing said transformed monitor colors by a color printer.

4. The method of claim 3 further comprising matching transformed monitor colors to colors that can be printed by said printer.

5. The method of claim 1 wherein said calculating a set of hue correction values and said chroma correction values comprises calculating a subset of all hue correction values and chroma correction values for a subset of monitor colors; and wherein said applying comprises:

interpolating hue correction values and chroma correction values in said subset for particular monitor colors generated and applying interpolated hue correction values and chroma correction values to said particular monitor colors for transforming said monitor colors.

6. The method of claim 1 wherein said computing a set of fully adapted monitor colors comprises:

converting monitor colors to a monitor color RGB colorspace;

identifying a monitor white point RGB value;

dividing each monitor color RGB value by said monitor white point RGB value to obtain an intermediate RGB value;

multiplying each intermediate RGB value by RGB value of an anticipated viewing illuminant of a sheet of paper upon which said transformed monitor colors are to be printed.

7. The method of claim 6 wherein said computing a set of partially adapted monitor colors comprises:

multiplying each monitor color RGB by an RGB value of an illuminant that is a mixture of the monitor white point and said anticipated viewing illuminant.

8. The method of claim 1 wherein applying said hue correction values and said chroma correction values comprises:

generating initial monitor colors;

subtracting off a white component from said initial monitor colors to generate intermediate monitor colors;

computing hue correction values for said intermediate monitor colors;

computing chroma correction values for said intermediate monitor colors;

converting said initial monitor colors to full adapted monitor colors assuming full adaption to an anticipated viewing illuminant of a sheet of paper on which is to be printed said transformed monitor colors;

applying said hue correction values to said fully adapted monitor colors; and applying said chroma correction values to said fully adapted monitor colors.

9. The method of claim 1 further comprising:

printing said transformed monitor colors by a color printer.

10. A method for transforming monitor colors to printer colors comprising:

precomputing hue correction values and chroma correction values for a set of monitor colors, said precomputing comprising:

identifying hue samples in a monitor colorspace;

computing an RGB value of the monitor white point;

converting each hue sample to an RGB value;

dividing each hue sample RGB value by the RGB value of the monitor white point to obtain an intermediate RGB value;

calculating fully adapted RGB values by multiplying each intermediate RGB value by an RGB value of the anticipated viewing illuminant of a sheet of paper on which transformed monitor colors are to be printed;

generating partially adapted RGB values by multiplying each intermediate RGB value by an RGB value of an illuminant that is a mixture of the monitor white point and said anticipated viewing illuminant;

converting said fully adapted RGB values to fully adapted chroma values and fully adapted hue values;

converting said partially adapted RGB values to partially adapted chroma values and partially adapted hue values;

computing chroma correction values by dividing said partially adapted chroma values by said fully adapted chroma values;

computing hue correction values by subtracting said fully adapted hue values from said partially adapted hue values; and applying said hue correction values and said chroma correction values to monitor colors to obtain transformed monitor colors for printing by a color printer.

11. The method of claim 10 wherein said applying said hue correction values and said chroma correction values to monitor colors comprises:

generating initial monitor colors;

subtracting off a white component from said monitor colors;

interpolating said hue correction values and said chroma correction values to obtain interpolated hue correction values and chroma correction values for said monitor colors;

generating fully adapted monitor colors from said initial monitor colors by assuming full adaption to an anticipated viewing illuminant of a sheet of paper on which is to be printed said initial monitor colors;

applying said interpolated hue correction values to said fully adapted monitor colors to obtain transformed monitor hues;

applying said interpolated chroma correction values to said fully adapted monitor colors to obtain transformed monitor chromas;

combining said transformed monitor hues and said transformed monitor chromas to create transformed monitor colors for being printed by a color printer.

12. The method of claim 10 wherein said applying comprises applying interpolated hue correction values and chroma correction values to monitor colors to obtain transformed monitor colors for printing by a color printer.

13. The method of claim 10 wherein said applying comprises applying said hue correction values and chroma correction values to fully adapted monitor colors, assuming full adaption to an anticipated viewing illuminant of a sheet of paper on which is to be printed said transformed monitor colors, to obtain transformed monitor colors for printing by a color printer.

14. The method of claim 10 further comprising printing said transformed monitor colors on a color printer.

* * * * *